UNITED STATES PATENT OFFICE.

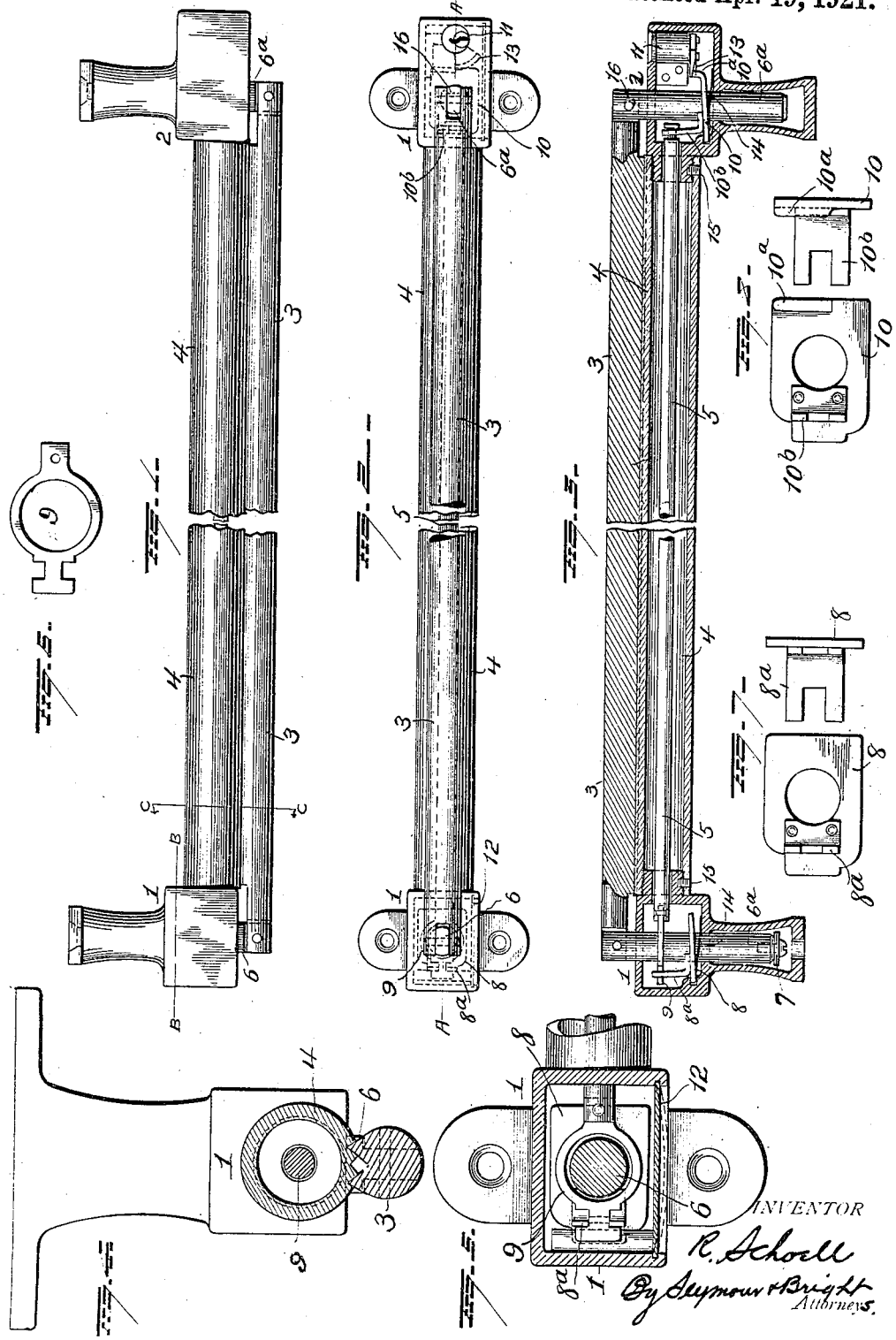

REINHOLD SCHOELL, OF STAMFORD, CONNECTICUT, ASSIGNOR TO THE YALE & TOWNE MANUFACTURING COMPANY, OF STAMFORD, CONNECTICUT.

ROBE-HOLDER FOR AUTOMOBILES.

1,375,611.　　　Specification of Letters Patent.　　Patented Apr. 19, 1921.

Application filed November 3, 1919. Serial No. 335,372.

*To all whom it may concern:*

Be it known that I, REINHOLD SCHOELL, a citizen of the United States, and a resident of Stamford, in the county of Fairfield and State of Connecticut, have invented certain new and useful Improvements in Robe-Holders for Automobiles; and I do hereby declare the following to be a full, clear, and exact description of the invention, such as will enable others skilled in the art to which it appertains to make and use the same.

My invention relates to an improvement in robe holders for automobiles and it consists in the parts and combination of parts as will be more fully explained and pointed out in the claims.

In the accompanying drawings: Figure 1 is a view in plan of my improved device; Fig. 2 is a view in front elevation; Fig. 3 is a sectional view on the line A—A of Fig. 2; Fig. 4 is a view in section on line C—C of Fig. 1; Fig. 5 is a view in section on the line B—B of Fig. 1; Fig. 6 is a view of the link connecting the connecting bar with one of the clutches and Figs. 7 and 8 are views of the clutches.

1 and 2 represent brackets adapted to be secured to the rear of the front seat in the usual manner and 4 is the robe rail or carrier attached at its ends to said brackets. The rail is tubular with internal threaded ends, and the brackets 1 and 2 are provided with external threaded lugs which are engaged by the threaded ends of the rail, and are secured thereto against accidental separation by the small screws 15 which are passed through the rail and into the threaded lugs. The brackets are hollow and their outer ends are enlarged to form housings for the locking devices to be hereinafter referred to. The enlarged outer end of each bracket is open at one side, which opening is closed, after all parts have been assembled, by a cover 12 which is made slightly curved or bellied and is secured in place by a pressure or blows applied in a direction to straighten the plate thus elongating it and forcing its ends into under cut slots formed in the ends of the housing, thus permanently securing it to the housing.

3 is the locking bar and 6 and $6^a$ are the locking bolts pivoted to the ends of the locking bar and adapted to enter openings formed in the outer ends of the brackets 1 and 2. In the drawings, I have shown these bolts round in cross section with correspondingly shaped openings through the housing members of the brackets for the passage and snug fit of the bolts but I would have it understood that the bolts may be angular or other shape in cross section and the openings in the brackets correspondingly shaped so as to prevent lateral movement of the bolts when the latter are locked in the housings as will be hereinafter explained. The locking bar is slotted at its ends to receive the tongues on the outer ends of the bolts and these tongues are pivoted within the slots in the bar by rivets, the rivet hole in tongue of bolt $6^a$ being slightly elongated as shown at 16 in Fig. 3, to permit the bar 3 to expand or elongate when released from the pressure of the robe and thus prevent a binding action between the bolts and the brackets.

Located within the housing of bracket 2 is the clutch 10 provided with a sharp edge opening through same but slightly larger than the bolt, and through which the bolt passes. One end of this clutch is seated in a slot in the housing of bracket 2, and it is normally pressed rearwardly at its free end by the spring 14, and when so pressed the walls of the hole or opening through the clutch plate grip the opposite sides of the bolt and absolutely prevent its withdrawal while so held, hence to release the bolt the free end of the clutch must be moved rearwardly to disengage said sharp edges from the bolt and this is done by the cam 13 of the cylinder of a key actuated lock 11, which cam has a beveled edge adapted to engage the rearwardly projecting lip $10^a$ at the free end of the clutch plate 10. By inserting a key in the cylinder of the lock and turning it, the cam 13 will be moved in a direction to force the free end of the clutch plate forwardly against the action of the spring 14 and thus disengage and release the bolt.

Secured to the rear face of clutch 10 is L-shaped finger $10^b$ having a slot in its rear free end to receive the notched end of the connecting bar 5. This bar is slightly longer than the rail 4 and passes longitudinally through the same, and also through the openings in the threaded lugs on the housing ends of the brackets 1 and 2, and terminates within said housings.

Secured to the end of the connecting bar 5 within the housing of bracket 1 is the ring shaped link 9, the opening through the same being of greater diameter than the bolt 6, hence is free to have a slight movement in the direction of the length of bar 5 without contacting with said bolt. This link is provided with a T-shaped lug adapted to enter a slot in the rear or free end of finger 8ª on clutch 8. This clutch 8, which is located within the housing of bracket 1 is secured in place like clutch 10 and is otherwise identical with said clutch 10 except that it has no lip for direct engagement with a lock. Clutch 8 engages bolt 6 similar to the engagement of bolt 6ª by clutch 10, hence when the bolts 6 and 6ª are engaged by the clutches the locking bar 3 will be held in its locking position with relation to the rail and absolutely prevent the removal of a robe or other article clamped between them.

The two clutches 8 and 10 are connected by the bar 5, and when clutch 10 is moved by the cam 13 to disengage it from bolt 6ª, bar 5 will be moved longitudinally to the right and acting through the loop 9 and finger 8ª on clutch 8, move the latter against the action of its spring 14 and thus release bolt 6.

When the two bolts are thus released from their clutches the bar 3 and its connected bolts 6 and 6ª can be pulled rearwardly, and if necessary or desired, the bolt 6ª can be wholly withdrawn, bolt 6 however being prevented from complete withdrawal by the disk 7, which by its engagement with the front face of clutch 8 limits the rearward or opening movement of the said bolt.

When the bar 3 has been thus removed from the rail 4, a robe, clothing or other articles can be hung on the rail and by then pushing forwardly on the bar 3 so as to clamp the articles between the rail and the bar the articles on the rail will be locked against removal until the bar has been released by a key and retracted.

In order to grip the robe or other article so as to prevent it from being pulled from between the clamping faces of the rail and rod, I provide the adjacent faces of both with ribs or corrugations as shown in Fig. 4.

With this construction the clamping bar 4 may be readily adjusted for different thicknesses of robes, apparel or other articles which it may be desired to secure against loss, and by using clutches of the character described to bite against smooth surfaces of the bolts, there is no give or lost motion whatsoever after the bolts have been secured. They are free to be pushed in and tightened, but are positively held against the slightest movement in a direction to loosen or release the articles clamped on the rail.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a safety robe holder, the combination of a robe rail, a clamping bar arranged to coact with the rail throughout the length of the latter, the clamping bar being movably connected at one end to the rail but secured against removal from the latter and provided at its other end with a movable bolt, a concealed tilting friction clutch adapted to engage the bolt for automatically locking the same with relation to the robe rail, and lock mechanism for releasing the clutch from its locking engagement with the bolt.

2. In a safety robe holder, the combination with a robe rail, and hollow brackets for supporting the same, of a clamping bar provided with bolts adapted to enter the brackets, and friction clutches located in the brackets and adapted to automatically lock the clamping bar in any desired adjustment with relation to the rail.

3. In a safety robe holder, the combination with a robe rail and hollow brackets for supporting the same, of a clamping bar provided with bolts adapted to enter the brackets, friction clutches located in the brackets and adapted to automatically lock the clamping bar in any desired adjustment with relation to the rail, and lock mechanism for simultaneously releasing the clutches from their locking engagement with the bolts, substantially as set forth.

4. In a safety robe holder, the combination with a robe rail, and hollow brackets for supporting the rail, of a clamping bar provided with bolts adapted to enter the brackets, tilting friction clutches supported inside the brackets, springs for normally holding the clutches in their locking positions, and means for simultaneously actuating the clutches and disengaging them from the bolts.

5. In a safety robe holder, the combination with a robe rail, and hollow brackets for supporting the rail, of a clamping bar provided with bolts adapted to enter the brackets, tilting friction clutches mounted inside the brackets, springs for normally holding the clutches in their locking position, and means inclosed within the hollow brackets and rail for simultaneously actuating the clutches and releasing the bolts, substantially as set forth.

6. In a safety robe holder, the combination with a robe rail, clamping bar and hollow brackets for supporting the rail and bar, of friction clutches located in the hollow brackets and adapted to automatically lock the clamping bar in any desired adjustment, and key lock actuated mechanism located in the hollow brackets and rail for actuating the clutches to unlock and release the clamping bar.

In testimony whereof, I have signed this specification in the presence of two subscribing witnesses.

REINHOLD SCHOELL.

Witnesses:
LEROY W. HOYT,
CHARLES A. BERRY.